United States Patent [19]

Taylor

[11] 3,860,556

[45] Jan. 14, 1975

[54] LOWER WATER ABSORPTION DENTAL RESTORATIVE

[75] Inventor: Charles W. Taylor, Lake Elmo, Minn.

[73] Assignee: Minnesota Mining and Manufacturing Company, St. Paul, Minn.

[22] Filed: Nov. 1, 1971

[21] Appl. No.: 194,510

Related U.S. Application Data

[63] Continuation-in-part of Ser. No. 873,600, Nov. 3, 1969, abandoned, which is a continuation-in-part of Ser. Nos. 713,318, March 15, 1968, Pat. No. 3,597,389, and Ser. No. 744,326, July 12, 1968, Pat. No. 3,541,068.

[52] U.S. Cl............................ 260/42.52, 260/998.11
[51] Int. Cl. ............................................. C08f 45/04
[58] Field of Search ........................................ 260/41

[56] References Cited
UNITED STATES PATENTS

| | | | |
|---|---|---|---|
| 3,066,112 | 11/1962 | Bowen | 260/41 |
| 3,234,194 | 2/1966 | Slocum | 260/89.5 A |
| 3,541,068 | 11/1970 | Taylor | 260/41 |

Primary Examiner—Theodore Morris
Attorney, Agent, or Firm—Alexander, Sell, Steldt & DeLaHunt

[57] ABSTRACT

Dental compositions are provided of inorganic particulate material as filler, tertiary aromatic amine as accelerator and, as vehicles or binders, methacrylate or acrylate esters of hydroxyalkyl esters of aromatic diphenols. Polymerization is initiated in these combinations by free radical generating catalysts to give products which have low sensitivity to moisture and are usefully employed in dental cavities as fillings.

7 Claims, No Drawings

LOWER WATER ABSORPTION DENTAL RESTORATIVE

This application is a continuation-in-part of my copending application, Ser. No. 873,600 filed Nov. 3, 1969, now abandoned, which was a continuation-in-part of my copending applications Ser. No. 713,318 filed Mar. 15, 1968 and Ser. No. 744,326, filed July 12, 1968, now U.S. Pat. Nos. 3,597,389 and 3,541,068, respectively.

This invention relates to improved moldable dental restorative compositions comprising acrylate or methacrylate esters of hydroxyalkyl ethers, i.e., hemiethers with di-or tri-primary diols or triols, of diphenols. In these restorative compositions, polymerization is initiated by free-radical generating catalysts. After polymerization is initiated the material is placed in cavities in teeth to provide polymeric restorations having excellent resistance to moisture, good strength and durability under oral conditions.

The filling or restoration of a cavity in a tooth is necessary to protect the tooth from further decay and eventual deterioration to the point at which it becomes a liability either because it introduces a source of infection or because it is so painful as to be intolerable. For many years, various types of fillings have been employed such as metals, either silver amalgams, gold or even other metals, and also various inorganic cement compositions such as silicates.

The difficulties with most of these fillings have been well recognized. Metallic fillings do not usually provide good sealing around the margins and infections can penetrate and develop in back of them. Furthermore, they give a somewhat unsightly contrast to the whiteness of teeth.

Silicate cements have been widely used but, in general, are relatively sensitive to leaching and deterioration under the moist conditions of the mouth.

Polymeric materials have been used for restorations by polymerization of various compositions in situ. Some such compositions included polymerized material suspended, or even partially dissolved, in monomer giving a polymeric restoration. Other restoratives are of the nature of polymerizable materials or binders with suspended inorganic fillers. This invention relates particularly to cavity-filling restoratives of this last category.

There are at least four criteria which can be applied to the restorative material and pertain especially to the binder.

1. Low toxicity.
2. Necessity for relatively low viscosity to permit use in filled dental restorative compositions.
3. Stability in oral conditions.
4. Compressive strength, particularly after exposure to oral conditions.

Toxicity is not so much the toxicity of ingestion, although unpleasant vapors and odor are objectionable, so much as it is the irritant effect of penetrating dentinal tubules and inflaming the pulp. This is particularly likely to be encountered when using binders comprising lower esters, such as methyl methacrylate, which have unpleasant odors and are relatively quite irritant. Previously proposed restorative compositions which included a suspension of polymethyl methacrylate in the monomer were obviously disadvantageous in this respect.

In order for the dentist to be able to force the restorative into the cavity rapidly before it hardens, it must be a composition having the proper consistency which is somewhat like putty. Of course, it must also be possible to include particulate filler which strengthens the ultimate restoration. Because the level of particulate filling is preferably relatively high, of the order of 60–80%, mixing of the binder with particulate filler is most readily effected without occluding much air if the viscosity of the binder is relatively low, below 10,000 centipoises. Binders with higher viscosities can be diluted with a lower ester such as methyl methacrylate and, in fact, that is found to be necessary in practice when using many prior art binders.

Stability in the oral cavity and retention of a reasonable level of strength are found to be largely a function of the absence of hydrophilic groups which enhance moisture absorption by the polymer. Binders, such as those of Bowen, U.S. Pat. No. 3,066,112, made by condensation of glycidyl methacrylate with phenols, e.g., bisphenol A, of necessity include hydroxyl groups from opening of an epoxy or oxirane ring and therefore are significantly hydrophilic. Furthermore, these materials have relatively high viscosities, of the order of 25,000 to 50,000 centipoises and higher, even to 250,000 and, as noted by Bowen, in order to be of use in dental binders must normally be diluted using a reactive diluent such as methyl methacrylate or tetraethylene glycol dimethacrylate. The former is, of course, one of the materials noted above as possessing toxicity.

Compressive strength of polymeric restoratives even containing silane treated inorganic fillers, has been relatively low as compared to amalgam fillings or the strength of the tooth structure itself. This is a distinct disadvantage from the standpoint of permanence of fillings as lowered compressive strength results in more rapid attrition.

In previous application, Ser. No. 713,318, now U.S. Pat. No. 3,597,389, it was pointed out that polycarbinol polymethacrylates and polyacrylates are valuable binders for dental purposes. It has been found that the polycarbinols which are hemiethers of certain diphenols form polymethacrylates which are resistant to hydrolytic degradation and have excellent properties for dental purposes as they have good strength and low sensitivity to moisture and when combined with suitable inorganic fillers, provide restorations matching the general tooth color for anterior and posterior teeth with relatively limited shrinkage on polymerization and favorable characteristics of thermal expansion over a range covering any normal oral conditions from about 0° to about 60° C.

It is an aim of this invention to provide polycarbinol polymethacrylates for dental applications. Other aims and objects will become evident from reading this application.

It has been found that especially valuable monomers for the compounding of restorative compositions are the polymethacrylates of diol and triol hemiethers of diphenols, which are free from active hydrogen atoms and may be formed by the esterification of primary hydroxyl terminated hydroxyalkylethers of diphenols. It should be noted that "polymethacrylate" in this usage does not refer to a polymer but to the presence of two or three methacrylate residues in a monomer. Those skilled in the art will recognize that the basic diphenolic compound is etherified at each phenolic OH by one OH of a diol or triol forming a bishemiether. A separate molecule of diol or triol being required for each phenolic OH. Remaining OH groups, e.g. of the diols, are then esterified by acrylic or methacrylic acid to provide the useful binders of this invention which are devoid of active hydrogen atoms. Particularly, they are free from hydroxyl groups. The diphenols which are used, i.e., dihydroxy aromatic compounds, have at least two noncondensed aromatic nuclei joined directly or through an intervening linking group such as —O—, —CH$_2$—,

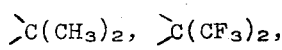

and —CH(CH$_3$)—. The aromatic nuclei are single rings, i.e., mononuclear, and are otherwise free from substituent groups other than linking groups and the phenolic OH groups required for the reaction.

In order that polymerization of these polymethacrylates may proceed rapidly after initiation an accelerator is usually used. The preferred class of accelerators are mononuclear aromatic tertiary amine accelerators for free radical polymerization such as N,N-dimethyl-p-toluidine, N,N-dimethyl aniline, N,N-dimethyl-p-anisidine, N,N-bis(hydroxyethyl)-3,5-xylidine N,N-bis(hydroxyethyl)toluidine, and the like. Other known accelerators for free-radical polymerization are considered generally the equivalents of the preferred class in kind although possibly not as efficient.

The amounts of accelerator are adjusted, as will be evident to those skilled in the art, so that initial setting is deferred for a few minutes after mixing; usually 3 to 5 minutes for dental compositions. This provides the time for mixing, depositing in a tooth cavity and consolidating before curing or setting has advanced beyond a workable stage. Usually 0.05 to 5 weight percent of accelerator is dissolved in the binder. A preferred proportion is about 0.2 to 0.5 weight percent for aromatic tertiary amines such as dimethyl-p-toluidine. N,N-bis(hydroxy-lower-alkyl) aromatic amines are used in amounts of about 0.2 to 3 percent. In these lower alkyl is generally 2-6 carbon atoms.

It is desirable that the monomers be devoid of any peroxide compounds which may be present as a artefacts in the preparation. A treatment with reducing agent prior to use is thus desirable. If this precaution is not taken, shelf life may be very short.

Test procedures for dental materials are contained in Guide to Dental Materials, American Dental Association, 2nd and 3rd editions, Chicago and proposed Tentative Specification for Composite Resin Filling Materials, September, 1967.

The fillers employed in the compositions of the invention may include small amounts of pigments, either for visual color or fluorescent effect, glassy spherules or particles in small sizes, crystalline materials such as lithium aluminum silicates, hydroxyapatite, silica or siliceous minerals, alumina or aluminiferous materials, glasses such as borosilicate glasses. Particles should be generally smaller than 50 microns and preferably smaller than 30 microns. A commercially available lithium aluminum silicate is used in certain examples herein as providing an exemplary and generally valuable filler. As obtained particles range from submicron sizes up to 44 microns with an average of about 2 to 15 microns or in some cases larger up to about 85 to 90 microns. Other fillers may be used in somewhat different proportions and may have slightly different properties from the exact figures given. The selection of filler is not critical in the present invention.

It is preferred that the fillers be treated to promote adhesion by the binder, for example, using a conventional vinyl silane treatment or other such pretreatment well known in the art for other fillers as disclosed in the above-mentioned Bowen U.S. Pat. No. 3,066,112.

It is found that the most satisfactory workable consistency for dental filling compositions is obtained when fillers having particle sizes in the average range of about 2 to 15 microns are milled with organic binder containing about 0.5 to 2 mole percent of tertiary amine accelerator (and including any diluent which may be desired) in proportions of about 60 to about 85 percent by weight of filler and 40 to 15 percent of binder. The preferred range is 65 to 80 percent of filler depending on its specific gravity. In both cases the lower percentages are used with more viscous binders. The exact proportions may be varied depending on individual preferences, temperature requirements, etc..

It is an important advantage of the instant binders that the viscosities are sufficiently low that a diluent is not necessary. This is in contrast to the very viscous hydroxyl-group containing moisture-absorptive binders described in the above-noted Bowen patent.

The dental restorative compositions of the invention having, after hardening and exposure to moisture, moisture absorption of less than 1 percent by weight, comprise as binder a liquid polymerizable organic binder comprising 0.05 to 5 percent of accelerator for free-radical polymerization and a polycarbinol polymethacrylate or polyacrylate, substantially free from active hydrogen atoms and devoid of peroxides of the formula MO(DO)$_n$X(OD)$_n$OM wherein M is methacrylate or acrylate, D is alkylene of 2 to about 6 carbon atoms, $n$ is 1 to 4 and X is the nucleus of a diphenol of at least two aromatic rings and from 12 to 24 carbon atoms.

Mixing of binder and filler may be by any convenient method and desirably with as little occlusion of air bubbles as possible. Milling or kneading by generally available procedures provides adequate blending. Ball-milling may be less desirable when a spherular filler is included. For convenience in dispensing to dentists two part systems are preferred. These may be two pastes, a paste and liquid or a liquid and solid. Catalyst is then included in one part and accelerator in the other. It is desirable to avoid inclusion of air during spatulation with catalyst before actually placing the polymerizing compositions in dental cavities. It is desired that the viscosity be not over about 10,000 centipoises. A low concentration of methacrylate groups (milliequivalents per gram of ester) is advantageous in decreasing shrinkage on polymerization although somewhat adversely affecting compressive strength. In general, therefore, the polyether methacrylate esters preferably do not have a very low molecular weight, i.e., 400 or more and upwards as compared to 100 for methyl methacrylate.

The polyether methacrylate esters which are particularly useful in dental restorative compositions of the present invention are represented by the general formula MO-(DO)$_n$X(OD)$_n$OM wherein M is methacrylate, D is alkylene of 2 to 6 carbon atoms, $n$ is 1 to 4 and X is the nucleus of a diphenol of at least two aromatic rings and from 12 to 24 carbon atoms. Some exemplary diphenols include bisphenol A, B, and F, biphenol HOC$_6$H$_4$C$_6$H$_4$OH, 1,1-bis(p-hydroxyphenyl)cyclohexane (HOC$_6$H$_4$)$_2$C$_6$H$_4$, 2,2-bis(4-hydroxyphenyl)hexafluoropropane (HOC$_6$H$_4$)$_2$C(CF$_3$)$_2$ and 1,1-bis(4-hydroxyphenyl)ethane (HOC$_6$H$_4$)$_2$CHCH$_3$. Substituents which may be present do not contain active hydrogen atoms.

It will be recognized that the methods of preparation used for this invention are expected to provide materials of the stated structure but that other materials may be formed at the same time which may also contribute to the usefulness of these materials. The methods of preparation employed in Bowen U.S. Pat. No. 3,066,112 are not applicable to the instant compositions and other synthetic procedures are used.

It may be desirable to use two or even more different glycols or to combine esters of two or more different glycols. This assists in decreasing crystallinity. In such cases all of the D's in a molecule will not be identical. Another method for decreasing crystallinity is to have $n$ in at least one of the glycol residues with a value above one on the average which is another feature which destroys symmetry. Different glycols thus include ethylene glycol, 1,2-propylene glycol, 1,2-butylene glycol, diethylene glycol, 3-oxahexylene glycol, dipropylene glycol, triethylene glycol (3,6-dioxaoctylene glycol), and others.

A general procedure for successive preparation of glycol hemiethers of bisphenols followed by esterification with methacrylic acid is to condense with an alkylene oxide and then esterify using acid catalysts. The procedure need not be outlined in detail because it is known in the art and has been carried out commercially. It is exemplified below for the bismethacrylate of 2,2-bis(4-hydroxyethoxyphenyl) propane which has also been available commercially.

Broadly the alkylene oxide, e.g., ethylene oxide, is condensed with the bisphenol, e.g., 2,2-bis-(4-hydroxyphenyl)propane, suitably in the presence of triethylamine at about 150° C. The hemiether in this illustrative instance is isolated as a crystalline solid from methanol melting 110°-112° C. Alternative procedures for preparing hemiethers include reaction of sodium or potassium salts of the bisphenol and an hydroxyalkyl bromide or chloride, e.g., 4-bromobutanol, 2-chloroethanol, etc.

The hemiether is esterified. Suitable, a crude reaction mixture may be used without isolation by adding a polymerization inhibitor, such as cuprous chloride, and p-toluene sulfonic acid as catalyst with the appropriate amount of methacrylic acid. Other methods of esterification include reaction with methacrylyl chloride or transesterification with methyl methacrylate.

Above procedures are used with ethylene oxide, 1,2-propylene oxide and 1,2-butylene oxide and with 2,2-bi(4-hydroxyphenyl)propane, 2,2-bis(4-hydroxyphenyl)-butane, bis(4-hydroxyphenyl)methane, 2,2-bis(4-hydroxyphenyl)-hexafluoropropane and biphenol to give the several hemiethers and the methacrylates thereof. Acrylates are also prepared using acrylic acid or acrylyl chloride.

Because of its ready availability the presently illustrated composition is:

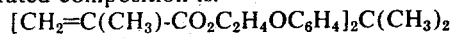

This may sometimes be known as ethoxylated bisphenol A bismethacrylate or as the bismethacrylate of the bisethylene glycol hemiether of bisphenol A or by other equivalent names.

EXAMPLe 1

4,4'-Di(2-hydroxyethoxy)bisphenol A

A 1 l. three necked round bottom flask equipped with a paddle stirrer, thermometer, gas inlet adaptor and dry-ice finger condenser, is charged with 342.0 parts (1.50 mole) of bisphenol A. The system is flushed with nitrogen and 2.5 parts by volume of triethylamine are introduced. The reaction mixture is heated to 155°C. at which temperature the charge is molten. Ethylene oxide (145 parts, 3.3 mole) is then introduced continuously, as a gas, through a flow meter at approximately 600 ml. per minute. This addition rate is sufficient to maintain the reaction temperature at 155°-160° C. over almost the entire addition period without the use of supplemental heat and without any significant refluxing of the ethylene oxide. The addition requires 2 hours. The mixture is allowed to cool to 110° C. at which point residual ethylene oxide is flushed out with nitrogen and 0.50 parts (0.013 mole) sodium borohydride introduced. After stirring 15 minutes the almost colorless solution is at 80° C. Methanol (950 parts by volume) is added and the solution cooled and allowed to crystallize. After filtration and drying 349 parts of white crystalline product are obtained, m.p. 108°-111° C.

4,4'-Di(2methacryloxyethoxy)bisphenol A

A 500 ml., three necked, round bottom flask equipped with magnetic stirrer, thermometer, Barrett trap and condenser and air inlet is charged with 158.2 parts (0.500 mole) of 4,4'-Di(2-hydroxyethoxy)bisphenol A, 94.6 parts (1.10 mole) of methacrylic acid, 0.25 parts (0.1%) of cuprous chloride, 7.6 parts (3%) of p-toluene sulfonic acid and 50 parts by volume of toluene. A slow stream of air is passed into the system as the mixture refluxes rapidly and water is removed. After 2 hours 1.1 mole of water has been collected and the mixture is cooled to room temperature. The product is diluted with 250 parts by volume of toluene, washed four times with 100 parts by volume of concentrated ammonium hydroxide and three times with similar portions of saturated sodium chloride. The toluene is removed at 60° C. with an air stream leaving 206.7 parts of light amber resinous ethoxylated bisphenol A bismethacrylate having hydroxyl content of 0.215 meq/g., α, β-unsaturation of 4.04 meq/g. and Brookfield viscosity of 2,000 cps.

EXAMPLE 2

A stable two part dental composition of the invention is prepared from the above ethoxylated bisphenol A bis methacrylate to which are added 0.75 percent by weight of N,N-bis(2-hydroxyethyl)-3,5-xylidine and 1.0 percent of the adduct of glycidyl methacrylate and phenyl salicylate (prepared as described in Example 3 below). This honey-like liquid is mixed in a proportion of 28 percent by weight with 72 percent of a powdered lithium aluminum silicate (calcined petalite) treated with vinyl silane and in which is absorbed about 0.5 percent of its weight of benzoyl peroxide and cast into test samples for use in American Dental Association tests. Water absorption after 500 hours is only 0.3 percent by weight. Polymerization shrinkage is 0.9 percent as compared to about 7 percent for methyl methacrylate systems. The compressive strength is 36,200 pounds per square inch and tensile strength by diametral tests 6,000 pounds per square inch.

EXAMPLE 3

Dental filling compositions are prepared using pigmented siliceous materials as the inert inorganic filler. An example is a finely divided (preferably below 50 micron size) powdered borosilicate glass which is intimately mixed with about 0.1% of fluorescent pigment, about 0.01 percent of raw sienna and a few thousandths percent of very finely divided black and yellow pigments. This combination is found to be approximate normal tooth color in many cases and can be further colored when necessary. It is desirable to apply a treatment to this filler to promote wetting by resins. Silane treatment as with methacrylyl oxypropyl silane is appropriate.

One method for dispensing a composition is as a two part system of liquid and solid components which can be combined either from separate containers or are intermingled by rupture of a seal intervening between predetermined amounts. The dry component is formed from 69.65 parts of the above inorganic filler (including pigments) thoroughly mixed with 0.35 part of benzoyl peroxide. The resultant mixture is a dry powder.

The liquid composition is made from 29.50 parts of the bis methacrylate of 2,2-bis(p-hydroxyethoxyphenyl) propane:

$[CH_2=C(CH_3)CO-OC_2H_4OC_6H_4]_2C(CH_3)_2$ containing about 0.01 percent of methyl hydroquinone as inhibitor.

An adduct is made from phenyl salicylate (318 parts, 1.5 moles) with glycidyl methacrylate (113 parts, 0.83 moles) and about 4.3 parts of dimethyl-p-toluidne by heating at 60° C. for about 6 days followed by removal of unreacted salicylate first by Crystallization then by mild alkaline washes.

The bismethacrylate resin is thoroughly mixed with 0.29 part of the above phenyl salicylate adduct with glycidyl methacrylate and 0.21 part of N,N-bis-(2-hydroxyethyl)-3,5-xylidine. Aliquots in these weight proportions (70:30) suitably totalling about 0.5–2.0 grams, are placed in different parts of a package having a rupturable membrane. Mixing is effected by rupturing the membrane and kneading the solid and liquid together. This is done rapidly and the paste is used for filling previously prepared cavities in teeth. It sets rapidly to a sound filling.

An alternative procedure is to prepare two pastes which are mixed mechanically or by spatulation in equal amounts. The pastes may be prepared to have viscosities in the range of 100–8,000 centipoises and preferably about 1,000 to 4,000 centipoises.

One paste is made containing 72 parts of the above siliceous filler with 27.27 parts of the above resin, 0.28 parts of the adduct of phenyl salicylate and glycidyl methacrylate and 0.45 parts of N,N-bis(hydroxyethyl)-p-toluidine. The second paste contains 25.58 parts of resin, 74 parts of siliceous filler 0.42 part of benzoyl peroxide and a trace (500 parts per million, 0.05 percent) of commercial butylated hydroxy toluene as an inhibitor. Equal portions of the two pastes are packaged, for example, in tubes and small amounts are dispensed and mixed as required. The resultant composition is effective for filling cavities.

EXAMPLE 4

A series of hydroxyethylated bisphenol A's is made of the general formula:

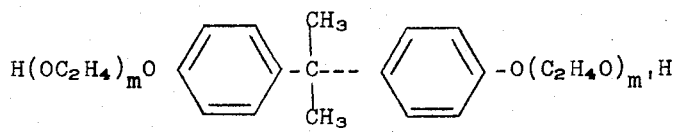

in which $m$ plus $m'$ ranges from about 1 to about 6. The procedure is that of Example 1, in which a 10 mole percent excess of ethylene oxide was used, but using various proporations of ethylene oxide, namely, 2, 2.6, 3.0, 4.0 and 6.0 moles per mole of bisphenol A. In order to determine the values of $m$ and $m'$ in the above formula small samples of each composition were converted to the silyl ethers, e.g.,

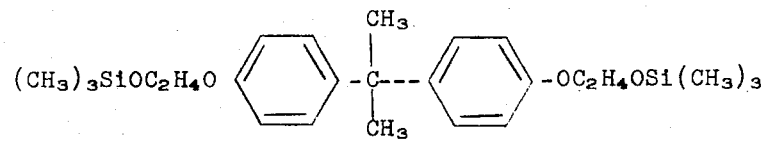

by reaction with N,O-bis-(trimethylsilyl)acetamide $(CH_3)_3Si-OC(CH_3)=NSi(CH_3)_3$ followed by vapor phase or gas chromatography injecting at 260° C on to a 4 foot × ⅛ inches of 4% purified liquid methyl silicone on high density diatomite support (OV101 on chrome GS) column using helium at 25 ml./min. at 150° – 300° C increasing 8° C per min. and flame ionization detection followed by isolation and mass spectrographic determination of molecular fragments. The amounts of product in percent by weight for the various values of $m + m'$ for the different mole ratios of ethylene oxide above are shown in the following table. Material not accounted for is a combination of loss and higher members of the series and is tabulated as "balance." The molecular weights and viscosities of the respective bis methacrylates also prepared as in Example 1 are included.

TABLE 1

| Moles $C_2H_4$ m+m' | 2 | 2.6 | 3.0 | 4.0 | 6.0 |
|---|---|---|---|---|---|
| 1 | 8.7 | 2.8 | 0.5 | — | — |
| 2 | 79.6 | 54.2 | 35.5 | 11.6 | 8.0 |
| 3 | 5.6 | 27.2 | 37.6 | 27.3 | 20.6 |
| 4 | 0.9 | 6.7 | 16.2 | 30.2 | 26.9 |
| 5 | — | — | 4.2 | 15.4 | 22.9 |
| 6 | — | — | — | 6.0 | 13.4 |
| Balance | 4.8 | 2.6 | 6.1 | 7.0 | 8.2 |
| Bis methacrylates molecular wt. | 452 | 479 | 496 | 540 | 628 |
| viscosity (cps) | 1400 | 1050 | 940 | 690 | 600 |

The bismethacrylates containing about 50% or more of the ester in which $m + m'$ is 2 tend to contain more or less crystals of that bismethacrylate, the higher esters are not crystalline and, in fact, can dissolve appreciable amounts of the crystalline materials. These esters are all suitable in dental filling compositions.

EXAMPLE 5

Another approach to the elimination of crystallinity is by use of bisphenol B

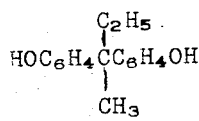

in place of bisphenol A. The reactions of Example 1 are repeated using the proportional amount of bisphenol B and ethylene oxide in 10 mole % excess and the hydroxyethylated bisphenol B is converted to the bismethacrylate which is a honey-colored oil which resists all efforts at inducing crystallization. Viscosity is 3,770 cps. It is suitable in restorative compositions.

EXAMPLE 6

The procedure of Example 1 is modified to use sodium methoxide as catalyst instead of triethylamine and propylene oxide is condensed with bisphenol A. The reaction is less exothermic and slower but proceeds readily. Conversion to the bismethacrylate gives a yellow oil with Brookfield viscosity of 3,200 cps. which is suitable in restorative compositions.

EXAMPLE 7

This example provides comparisons between the binders of this invention which are free from active hydrogen atoms and prior art binders which contain active hydrogen atoms as hydrophilic OH groups.

Several dental restorative compositions are made for comparison of compressive strengths. The compositions are designated as A, B, C and D. Each is filled using a fine crushed glass material, treated with vinyl silane as described in Chang U.S. Pat. No. 3,452,437 and additionally including a coating of about 0.7% of benzoyl peroxide. The binder is thus milled with the filler and catalyst at the same time.

Restorative A is prepared from 2,2-bis(4-hydroxyphenyl)-propane (bisphenol A) and glycidyl methacrylate essentially as described in the above Bowen and Chang patents using 90.4 parts glycidyl methacrylate 66 parts bisphenol A and about 0.78 parts dimethyl-p-toluidine. A small amount (about 0.025 parts) of hydroquinone monomethyl ether is present to inhibit polymerization during reaction. About 1.76 parts of triphenylborane ammonia are added as described in the Chang patent together with a further 0.83 parts of dimethyl-p-toluidine. As a reactive diluent, 17.8 parts of methyl methacrylate are added to the product as suggested by both Bowen and Chang. Ground glass filler prepared as described above is included to 72%, i.e., 28 parts binder and 72 parts filler.

Restorative B includes a hydroxyethylated biphenol A bis methacrylate binder of the invention prepared as described in Example 1 but using sodium methoxide as catalyst and incorporates the same filler in the same amount as in Restorative A.

Restorative C also includes a hydroxyethylated bisphenol A bismethacrylate as in Restorative B but from a different batch as binder and 65% of the same filler as in Restoratives A and B.

Restorative D is like Restorative C and uses the same binder to which is added 15% of triethylene glycol bismethacrylate as a reactive diluent. The combined binder is then filled using 70% of the same filler as used in the other restoratives.

Cylindrical test samples, about 6 mm. in diameter and 12 mm. high with parallel surfaces, are prepared using suitable amounts of each binder together with the standard catalyst-filler combination described above. Mixing time is fairly short, about 1 ¼ minutes and the samples are then hardened in the mold in an oven at 37° C.

Testing for compressive strength is in an Instrom Tester using 0.05 cm./min. rate for application of compression and is followed noting the rate of distortion so that the yield point, referred to as proportional limit, at which increase of distortion with increasing load starts to deviate from being essentially linear.

Some test specimens are stored in water at 37° C. and tested by the same procedure after various periods of time.

The compressive strengths and yield points (both in pounds per square inch) are tabulated in Tables 2 and 3 respectively both initially (either dry or after 24 hours wet storage) and after prolonged wet storage.

TABLE 2

| Resto-rative | Compressive Strength | | Prolonged Wet Storage | |
|---|---|---|---|---|
| | Dry Strength | Wet Strength (24 hrs. stor.) | Strength | Time |
| A | 27,000 | — | 21,600 | 5 mos. |
| B | 28,000 | — | 29,200 | 4.5 mos. |
| C | — | 27,800 | 28,500 | 57 days |
| D | — | 30,500 | 29,900 | 57 days |

TABLE 3

| Resto-rative | Yield Point | | Prolonged Wet Storage | |
|---|---|---|---|---|
| | Dry Strength | Wet Strength (24 hrs. stor.) | Strength | Time |
| A | 22,000 | — | 10,200 | 5 mos. |
| B | 17,000 | — | 15,600 | 4.5 mos. |
| C | — | 15,500 | 18,200 | 57 days |
| D | — | 17,500 | 18,100 | 57 days |

It will be evident that the composition including the prior art binder decreased significantly on wet storage in compressive strength and even more in the yield point whereas restoratives of the invention were not significantly affected by wet storage. This will be an evident advantage of the instant restoratives.

What is claimed is:

1. A stable dental restorative composition having, after hardening and exposure to moisture, moisture absorption of less than 1 percent by weight, said composition comprising glassy or crystalline inorganic non-metallic filler and, as binder, a liquid polymerizable organic binder consisting essentially of 0.05 to 5 percent of mononuclear aromatic tertiary amine accelerator for free-radical polymerization and a polycarbinol polymethacrylate or polyacrylate, substantially free from active hydrogen atoms and devoid of peroxides, of the formula

wherein M is methacrylate or acrylate, D is unsubstituted alkylene of 2 to about 6 carbon atoms, $n$ is 1 to 4 and X is the nucleus of a diphenol of at least two aromatic rings and from 12 to 24 carbon atoms.

2. The composition of claim 1 wherein the accelerator is N,N-bis(hydroxy-lower-alkyl)-p-toluidine or -3,5-xylidine.

3. A kit for preparing a moisture resistant dental filling comprising two components in which the total composition comprises about 65 to 80 percent of glassy or crystalline inorganic non-metallic particulate filler and catalyst together and about 35 to 20 percent of liquid polymerizable methacrylate or acrylate organic binder consisting essentially of 0.05 to 5 percent of mononuclear aromatic tertiary amine accelerator for free-radical polymerization and polycarbinol polymethacrylate substantially free from active hydrogen atoms and devoid of peroxides of the formula $MO(DO)_nX(OD)_nOM$ wherein M is methacrylate or acrylate, D is unsubstituted alkylene of 2 to about 6 carbon atoms, $n$ is 1 to 4 and X is the nucleus of a diphenol of at least two aromatic rings and from 12 to 24 carbon atoms.

4. A kit according to claim 3 having a dry component composed of particulate filler with any pigments and catalyst and liquid component.

5. A kit according to claim 3 having two paste components each comprising particulate filler and binder and one containing catalyst and the other containing accelerator.

6. A dental restorative composition according to claim 1 wherein the organic binder is
$[CH_2=C(CH_3)COOC_2H_4OC_6H_4]_2C(CH_3)_2$.

7. A kit according to claim 4 wherein the liquid component has a viscosity of less than 10,000 centipoises.

* * * * *

UNITED STATES PATENT OFFICE
CERTIFICATE OF CORRECTION

PATENT NO. : 3,860,556
DATED : January 14, 1975
INVENTOR(S) : Charles W. Taylor

It is certified that error appears in the above-identified patent and that said Letters Patent are hereby corrected as shown below:

Column 5, line 59, "2,2-bi(4-hydroxyphenyl)propane," should read as -- 2,2-bis(4-hydroxyphenyl)propane, -- .
Column 6, line 5, "EXAMPLe 1" should read as -- EXAMPLE 1 -- .
Column 6, line 31, "4,4'-Di(2methacryloxyethoxy)bisphenol A" should read as -- 4,4'-Di(2 methacryloxyethoxy)bisphenol A -- .
Column 12, line 6, "filler with any" should read as -- filler together with any -- .

Signed and sealed this 20th day of May 1975.

(SEAL)
Attest:

RUTH C. MASON
Attesting Officer

C. MARSHALL DANN
Commissioner of Patents
and Trademarks